US010314061B1

(12) United States Patent
Park

(10) Patent No.: US 10,314,061 B1
(45) Date of Patent: Jun. 4, 2019

(54) SYSTEMS AND METHODS FOR PERFORMING A GROUP CALL USING A DATA BEARER

(71) Applicant: Sprint Spectrum LP, Overland Park, KS (US)

(72) Inventor: Sunyong Park, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1 day.

(21) Appl. No.: 15/726,344

(22) Filed: Oct. 5, 2017

(51) Int. Cl.
*H04W 4/00* (2018.01)
*H04W 72/12* (2009.01)
*H04W 4/06* (2009.01)

(52) U.S. Cl.
CPC .......... *H04W 72/121* (2013.01); *H04W 4/06* (2013.01); *H04W 72/1273* (2013.01)

(58) Field of Classification Search
None
See application file for complete search history.

(56) References Cited

U.S. PATENT DOCUMENTS

2014/0064071 A1* 3/2014 Paladugu .......... H04W 28/0268 370/230
2014/0064177 A1* 3/2014 Anchan .................. H04W 4/08 370/312
2014/0179293 A1* 6/2014 Li .......................... H04W 4/08 455/416
2015/0087298 A1* 3/2015 Li ........................ H04L 67/325 455/426.1
2015/0172874 A1 6/2015 Lin et al.
2015/0173107 A1* 6/2015 Newberg ............. H04W 76/45 455/416
2015/0257151 A1 9/2015 Lin
2015/0341494 A1* 11/2015 Zhou ...................... H04W 4/10 370/242
2016/0218822 A1* 7/2016 Meng .................... H04L 1/0003
2017/0188341 A1* 6/2017 Tan ........................ H04W 4/06

* cited by examiner

*Primary Examiner* — Farah Faroul

(57) ABSTRACT

Systems and methods are described for performing a group call using a data bearer. At a core network in communication with an access node, a request to establish a group call may be received. A multicast data bearer may be established with the access node such that group call data from the core network is communicated over the multicast data bearer to the access node. Group call data may be communicated between the access node and a first wireless device and the access node and a second wireless device, wherein downlink group call data from the core network for both the first wireless device and the second wireless device is transmitted to the access node over the multicast data bearer.

20 Claims, 15 Drawing Sheets

SYSTEMS AND METHODS FOR PERFORMING A GROUP CALL USING A DATA BEARER

TECHNICAL BACKGROUND

Telecommunication systems, such as cellular networks or other wireless networks, rely on multiple network elements to provide reliable services for a plurality of wireless device. In some circumstances, it may be beneficial to provide a group call service such that a number of participants may be included on the call. Such a configuration may be practical in a professional setting, for planning purposes where a number of individuals are expected to participate on a call, or in other suitable circumstances. Systems that consider efficient resource usage when performing a group call may provide enhanced services to user.

Overview

Systems and methods are described for performing a group call using a data bearer. At a core network in communication with an access node, a request to establish a group call may be received. A multicast data bearer may be established with the access node such that group call data from the core network is communicated over the multicast data bearer to the access node. Group call data may be communicated between the access node and a first wireless device and the access node and a second wireless device, wherein downlink group call data from the core network for both the first wireless device and the second wireless device is transmitted to the access node over the multicast data bearer. At the access node from the first wireless device, uplink data for the group call may be received, wherein the uplink data is carried from the access node to the core network over the group call data bearer.

DETAILED DESCRIPTION

In an embodiment, a group call may be established for a plurality of participant wireless devices. For example, a group call may be beneficial to organizations that seek a plurality of wireless devices participants for a call, the ability to provide input for a number of the wireless device participants, and the ability to actively listen for a number of the wireless device participants. Some implementation of group calling may be inefficient. For example, downlink data on a group call is often the same for listening participants. Accordingly, a degree multicasting may be leveraged to enhance efficiency. Further, a plurality of access nodes may each include a plurality of wireless device participants. Here too, multicasting to each access node that includes a participant wireless device may further provide efficiency with regard to link resources.

In an embodiment, a multicast data bearer may be established between an access node and a core network for the wireless communication network. The multicast data bearer may carry data for each wireless device participant in communication with the access node to the access node from the core network. In some embodiments, using the established data bearers to carry group call data may enhance resource efficiency and provide enhanced services to users of the system.

Figure 1:
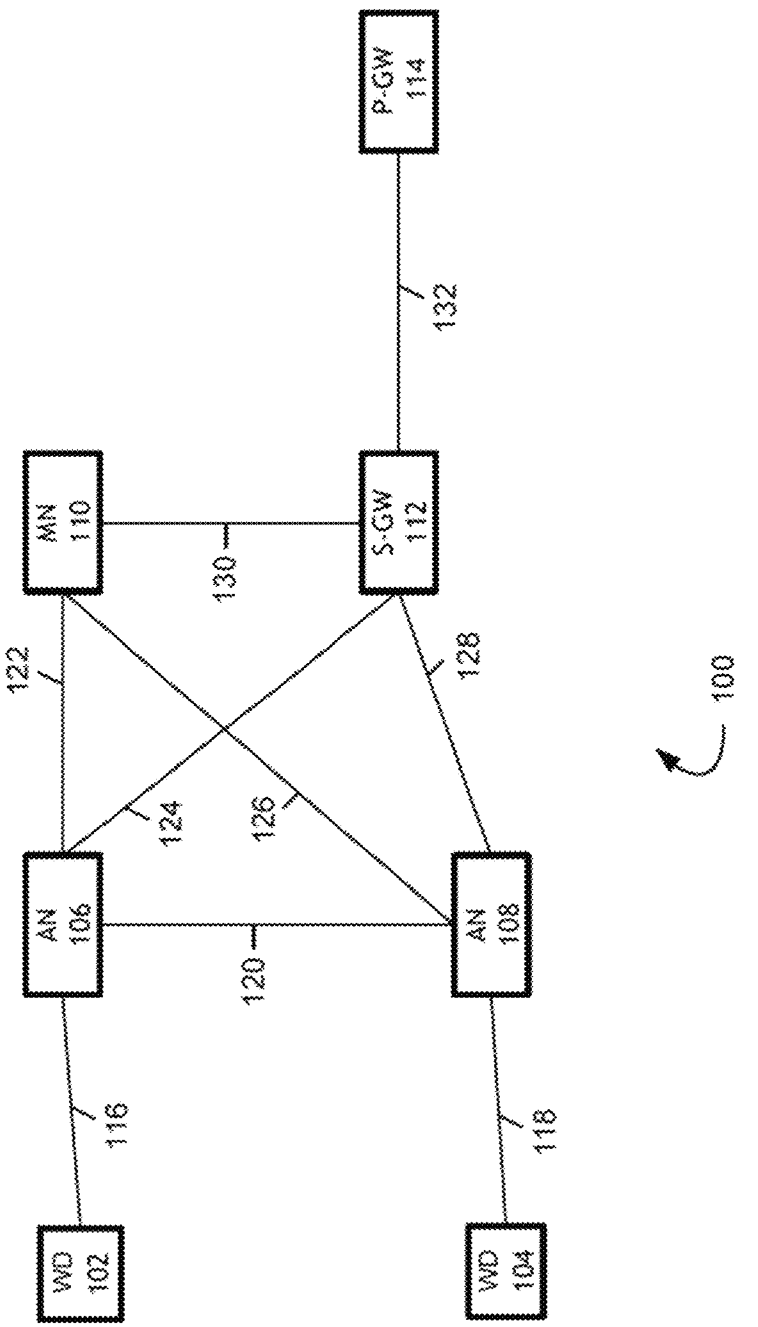
FIG. 1 illustrates an exemplary communication system to perform a group call using a data bearer.

FIG. 1 illustrates an exemplary communication system 100 to perform a group call using a data bearer comprising wireless devices 102 and 104, access nodes 106 and 108, management node 110, gateway nodes 112 and 114, and communication links 116, 118, 120, 124, 126, 128, 130, 132, and 134, and communication network 136. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106 and 108, management node 110, and gateway nodes 112 and 114 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 106 and 108 are network nodes capable of providing wireless communications to wireless device 102, and can be, for example, a base transceiver station, a radio base station, a small cell (e.g., picocell, femtocell, and the like) and an eNodeB device. Although only two access nodes are illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Management node 110 can comprise a processor and associated circuitry to execute or direct the execution of computer-readable instructions to obtain information. Management node 110 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 110 can receive instructions and other input at a user interface. Management node 110 can comprise a processor and associated circuitry to execute or direct the execution of computer-readable instructions to obtain information. In an embodiment, management node 110 can comprise a mobility management entity (MME) node.

Gateway nodes 112 and 114 are network elements which can comprise a processor and associated circuitry to execute or direct the execution of computer-readable instructions. Gateway node 112 and 114 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 112 and 114 can provide instructions to access nodes 106 and 108 related to channel selection in communications with wireless devices 102 and 104. In some embodiments, gateway nodes 112 and 114 may comprise a single node. Gateway nodes 112 and 114 can comprise at least one of a serving gateway (SGW), a packet data network gateway (PDNGW), a cellular gateway (CGW), and a combination thereof.

Communication network 136 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 136 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 136 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 116, 118, 120, 124, 126, 128, 130, 132, and 134 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless device 102 such that access node 106 provides the wireless device access to a communication network (e.g., communication network 136) and access node 108 may establish communication with wireless device 104 such that access node 108 provides the wireless device access to a communication network (e.g., communication network 136). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. For example, a group call may be beneficial to organizations that seek a plurality of wireless devices participants, the ability to provide input for a number of the wireless device participants, and the ability to actively listen for a number of the wireless device participants. Some implementation of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 106 may be in communication with a plurality of wireless devices that comprise group call participants and access node 108 may be in communication with a plurality of wireless devices that comprise group call participants. Here, multicasting to each access node that includes a participant may further provide efficiency with regard to link resources.

In an embodiment, data bearers (e.g., EPS data bearers) may be established with each of access nodes 106 and 108. For example, the data bearer may be established between an access node and a core network (e.g., Evolved Packet Core (EPC) network) for the wireless communication network. The core network may comprise of one or more of management node 110, gateway nodes 112 and 114, and other core network nodes not illustrated in FIG. 1. A data bearer between, for instances, access node 106 and the core network may comprise a logical connection used for communication between one or more of access node 106, management node 110, and gateway nodes 112 and 114. In some embodiments, using the established data bearers to carry group call data may enhance resource efficiency and provide enhanced services to users of the system.

Figure 2:
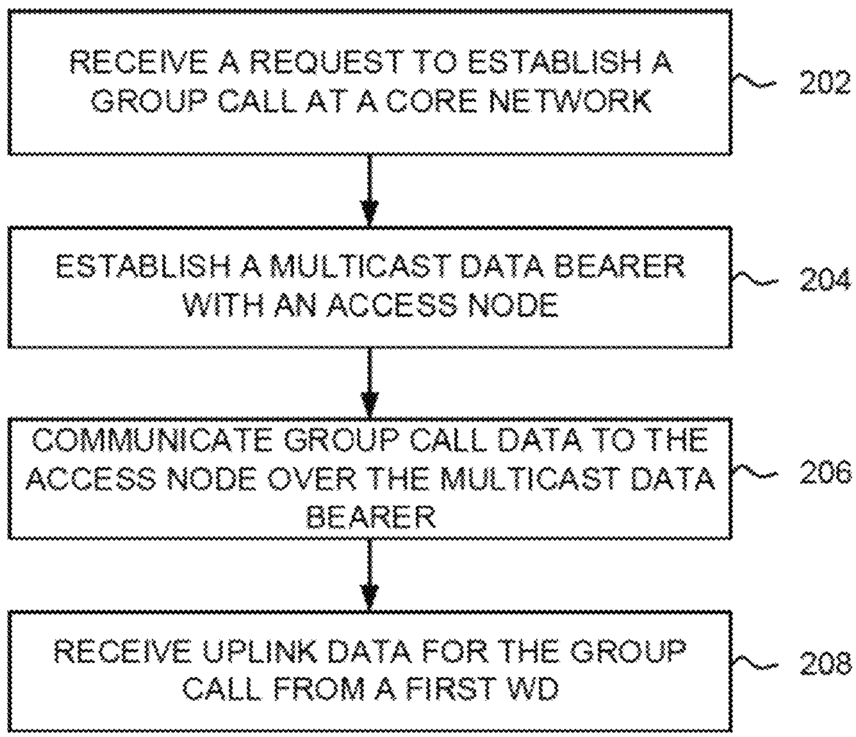
FIG. 2 illustrates an exemplary method for performing a group call using a data bearer.

FIG. 2 illustrates an exemplary method for performing a group call using a data bearer according to an embodiment. The method will be discussed with reference to the exemplary communication system 100 illustrated in FIG. 1, however, the method can be implemented with any suitable communication system.

Referring to FIG. 2, at step 202, a request to establish a group call may be received at a core network. For example, wireless device 102 may transmit a request to establish a group call to access node 106, and access node 106 may then transmit the request to the core network (e.g., one or more of management node 110 and gateway nodes 112 and 114).

At step 204, a multicast data bearer may be established with the access node such that group call data from the core network is communicated over the multicast data bearer to the access node. For example, a multicast data bearer may be established between access node 106 and the core network (e.g., one or more of management node 110 and gateway nodes 112 and 114). Group call data may be communicated back and forth between access node 106 and the core network over the multicast data bearer.

At step 206, communicating group call data between the access node and a first wireless device and the access node and a second wireless device, wherein downlink group call data from the core network for both the first wireless device and the second wireless device is transmitted to the access node over the multicast data bearer. For example, access node 106 may be in communication with wireless device 102 and a second wireless device, where both of these wireless devices are participants on the group call. Group call data for these participant wireless devices may be carried from the core network to access node 106 over the multicast data bearer. Given that the group call data is the same for both of these participant wireless devices, the single multicast data bearer used to carry the data may be an efficient way to transport data between the core network and access node 106.

At step 208, uplink data for the group call may be received at the access node from the first wireless device, wherein the uplink data is carried from the access node to the core network over the group call data bearer. For example, in an embodiment wireless device 102 may comprise permission to transmit uplink data for the group call. Wireless device 102 may transmit the uplink data to access node 106, and access node 106 may then transmit the uplink data to the core network over the established multicast data bearer.

Figure 3:
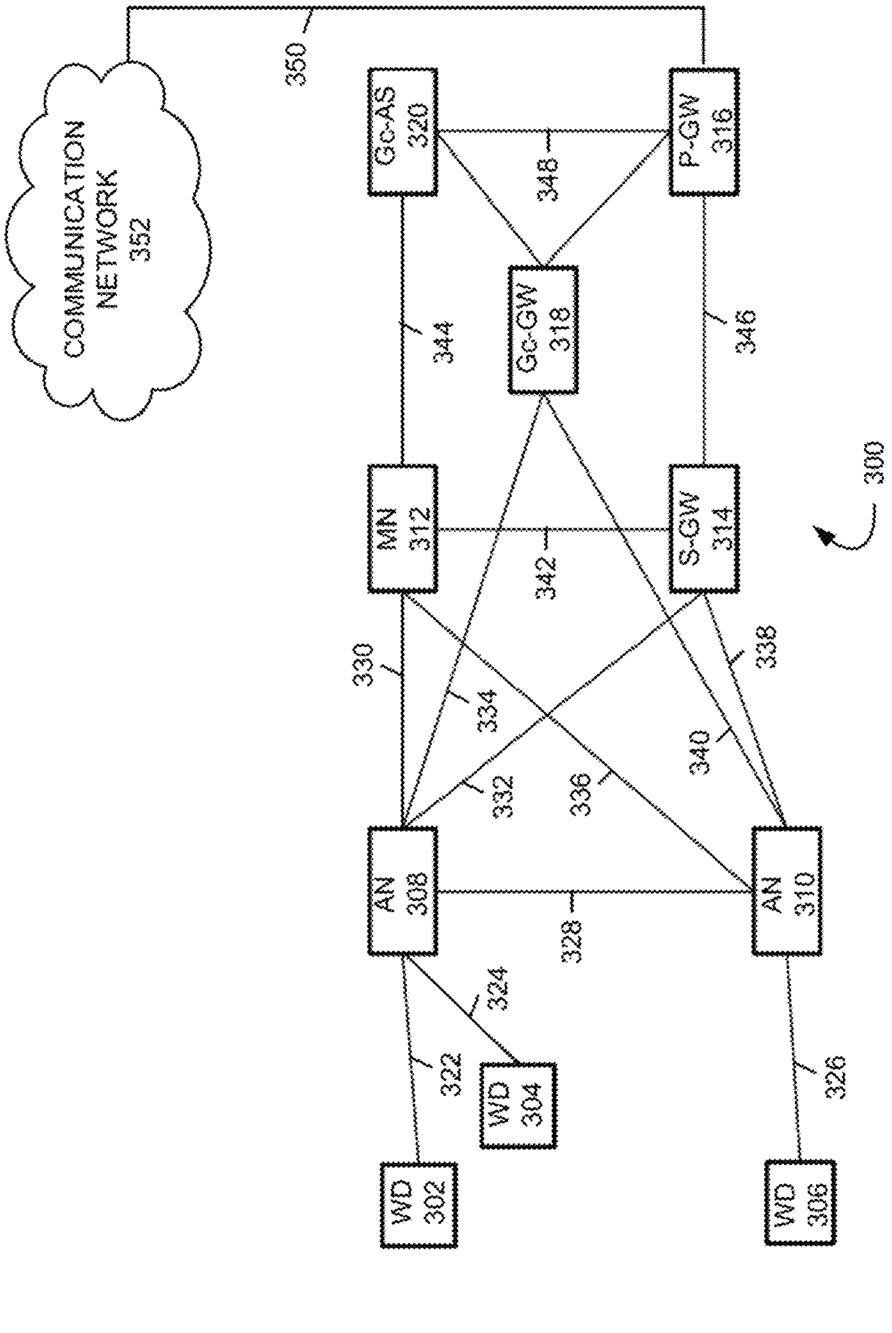
FIG. 3 illustrates another exemplary communication system to perform a group call using a data bearer.

FIG. 3 illustrates another exemplary communication system 300 to perform a group call using a data bearer. Communication system 300 may comprise wireless devices 302, 304, and 306, access nodes 308 and 310, management node 312, gateway nodes 314 and 316, group call gateway node 318, group call server node 320, communication network 352, and communication links 322, 324, 326, 328, 330, 332, 334, 336, 338, 340, 342, 344, 346, 348 and 350. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, and 306 can be any device configured to communicate over communication system 300 using a wireless communication link. For example, wireless devices 302, 304, and 306 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 308 and 310 are network nodes capable of providing wireless communications to wireless device 302, and can be, for example, a base transceiver station, a radio base station, a small cell (e.g., picocell, femtocell, and the like) and an eNodeB device. Although only two access nodes are illustrated in FIG. 1, wireless devices 302, 304, and 306 (and other wireless device not depicted) can be in communication with a plurality of access nodes and/or small cells. The plurality of access nodes and/or small cells can be associated with different networks and can support different communication protocols and radio access technologies.

Management node 312 can comprise a processor and associated circuitry to execute or direct the execution of computer-readable instructions to obtain information. Management node 312 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Management node 312 can receive instructions and other input at a user interface. In an embodiment, management node 312 comprises a controller node, a mobility management entity (MME) node, or any other suitable management node.

Gateway nodes 314 and 316 are network elements which can comprise a processor and associated circuitry to execute or direct the execution of computer-readable instructions. Gateway node 314 and 316 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 314 and 316 can provide instructions to access nodes 308 and 310 related to channel selection in communications with wireless devices 302, 304, and 306. In some embodiments, gateway nodes 314 and 316 may comprise a single node. Gateway nodes 314 and 316 can comprise at least one of a serving gateway (SGW), a packet data network gateway (PDNGW), a cellular gateway (CGW), and a combination thereof.

Group call server node 320 can comprise a processor and associated circuitry to execute or direct the execution of computer-readable instructions to obtain information. Group call server node 320 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Group call server node 320 can receive instructions and other input at a user interface. In some embodiments, management node 312 and group call server node 320 may comprise a single node.

Group call gateway node 318 is a network element which can comprise a processor and associated circuitry to execute or direct the execution of computer-readable instructions. Group call gateway node 318 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In some embodiments, gateway nodes 314 and 316 and group call gateway node 318 may comprise a single node.

Communication network 352 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 350 can be capable of carrying voice information and other information, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 352 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 352 may also comprise a wireless network, including base stations, wireless communication nodes, telephony switches, internet routers, network gateways, computer systems, communication links, or some other type of communication equipment, and combinations thereof.

Communication links 322, 324, 326, 328, 330, 332, 334, 336, 338, 340, 342, 344, 346, 348, and 350 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 308 may establish communication with wireless devices 302 and 304 such that access node 306 provides the wireless devices access to a communication network (e.g., communication network 352) and access node 310 may establish communication with wireless device 306 such that access node 310 provides the wireless device access to a communication network (e.g., communication network 352). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, a group call may be established for a plurality of participant wireless devices. Some implementation of group calling may be inefficient. For example, downlink data on a group call is often the same for the listening participants. Accordingly, a degree multicasting may be leveraged to enhance efficiency. Further, a plurality of access nodes may each include a plurality of wireless device participants. For example, access node 308 may be in communication with a plurality of wireless devices that comprise group call participants and access node 310 may be in communication with a plurality of wireless devices that comprise group call participants. Here, multicasting to each access node that includes a participant may further provide efficiency with regard to link resources.

In an embodiment, data bearers (e.g. EPS data bearers) may be established with each of access nodes 308 and 310. For example, the data bearer may be established between an access node and a core network (e.g., EPC core network) for the wireless communication network. The core network may comprise of one or more of management node 312, gateway nodes 314 and 316, group call gateway node 318, and group call server node 320 and other core network nodes not illustrated in FIG. 3. A data bearer between, for instances, access node 308 and the core network may comprise a logical connection used for communication between one or more of access node 308, management node 312, and gateway nodes 314 and 316, group call gateway node 318, and group call server node 320. In some embodiments, using the established data bearers to carry group call data may enhance resource efficiency and provide enhanced services to users of the system.

In an embodiment, system 300 may perform a group call using LTE radio access technology and network elements. In such an embodiment, the wireless device, such as wireless device 302, may include group call applications or implement group call protocols. In some examples, the wireless device may include both a groupcast data bearer and a unicast data bearer such that group call data is communicated over the groupcast bearer and control data (or other data) is communication over the unicast bearer. The wireless device may comprise multiple cell RNTI support.

In an embodiment, the access node, such as access node 308, may perform radio network layer management and radio network and transport network resource management for the group call communication with wireless devices. The eNB may also perform radio network layer system information generation and management, and scheduling and transmission for group call communication with wireless devices.

In an embodiment, the management node, such as management node 312, may perform core network management, such as E-RAB setup, deletion, modification, and management. The management node may also perform NAS layer processing and relaying for group call communication and core related system information management and application layer system information relay for group call communication.

In an embodiment, gateway nodes, such as gateway nodes 314 and 316, may perform group communication control support, such as group call floor support. The gateway nodes may also manage EPS unicast and group call multicast data bearers.

In an embodiment, a group call server node, such as group call server node 320, may perform group call application layer management, such as group call setup, release, participant addition and removal, and floor control. The group call server node may also perform group call media management, management of security keys for group calls, and group call application layer system information management.

In an embodiment, the group call gateway node, such as group call gateway 318, may perform group call multicast bearer path management including transport network resource management. The group call gateway node may also perform unicast and groupcast data bearer handling and group call communication security enforcement. FIGS. 4-10 illustrate group call flows for various group call related functions.

Figure 4A:
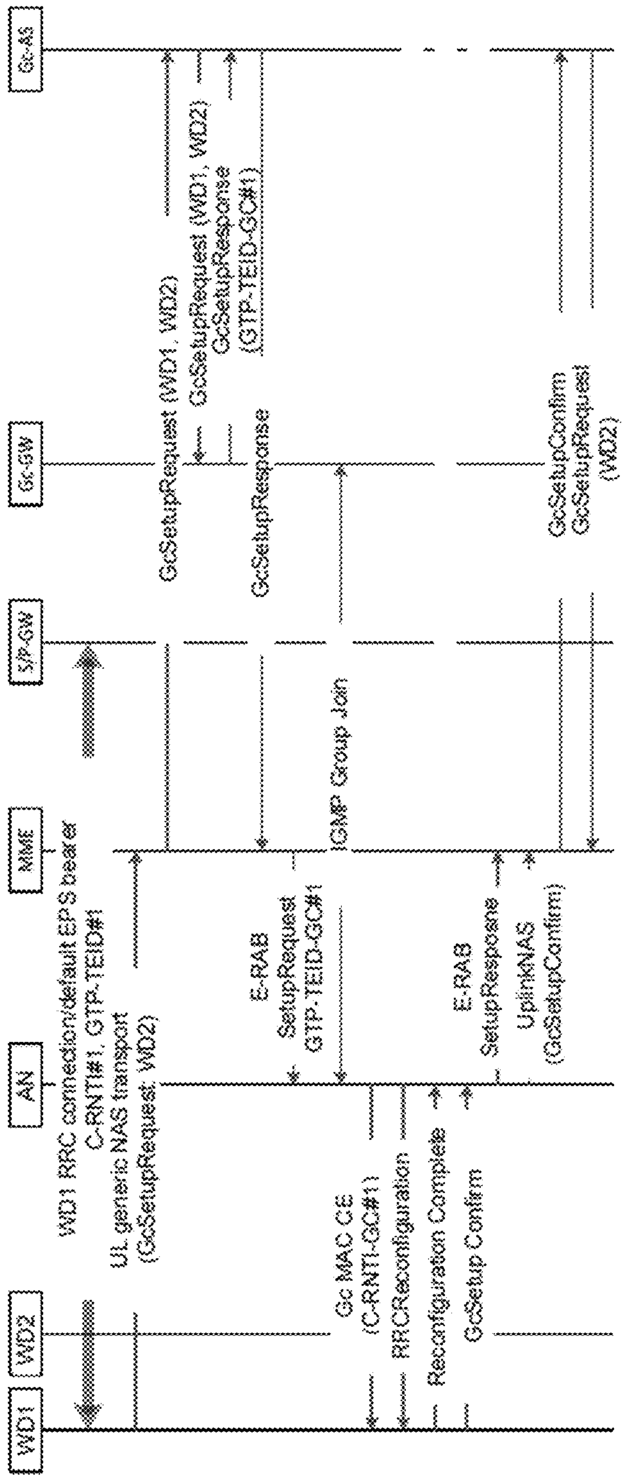
FIGS. 4A and 4B illustrate an exemplary signaling flow for establishing a group call.
Figure 4B:
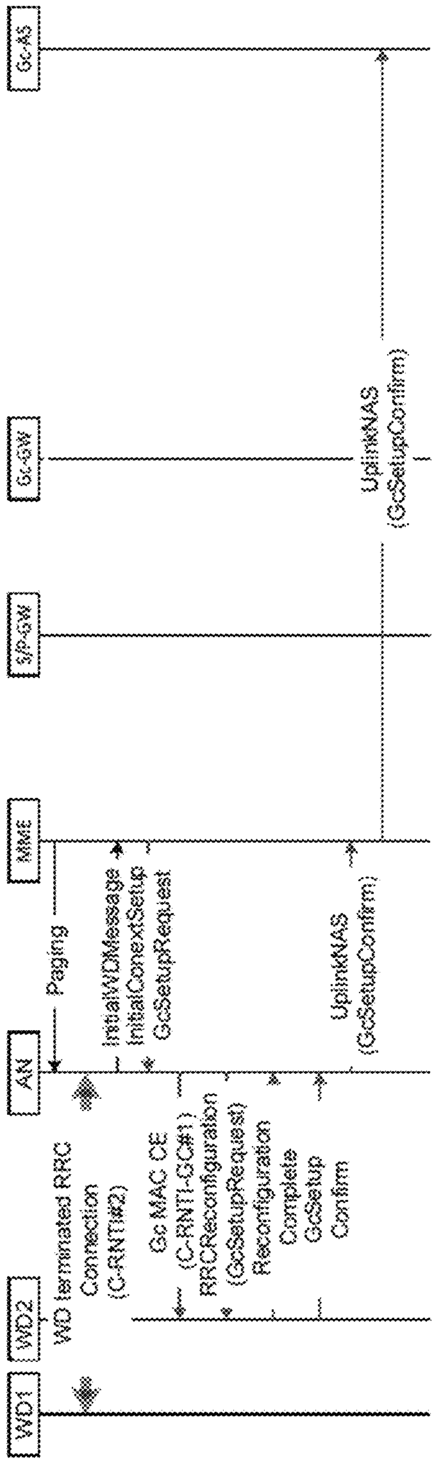

FIGS. 4A-4B illustrate an exemplary group call flow for establishing a group call according to an embodiment. In the illustrated embodiment in FIG. 4A, wireless device 1 and wireless device 2 may be in communication with an access node. The illustrated management node, gateway node, group call gateway node, and group call application server node may comprise a core network.

Wireless device 1 may transmit a NAS message that indicates wireless device 1 requests to establish a group call with wireless device 2. The request may be relayed from the management node to the group call server node, and the group call server node and the group call gateway may communicate and establish a group call identification for the requested group call. Subsequently, a group call setup response may be transmitted to the management node from the group call server node. The management node may then establish the multicast bearer with the access node for the group call. The access node may then send an Internet Group Management Protocol (IGMP) group join message to the group call gateway node.

As illustrated in FIG. 4B, the access node and wireless device may then transmit MAC and RRC connection messages such that the data bearers for the group call are setup for wireless devices 1 and 2. The pervious unicast bearer for wireless devices 1 and 2 with the access node may be terminated, and the new group call bearers (e.g., unicast bearer and multicast bearer) may be set up contemporaneously. Once complete, and NAS message may be transmitted from the access node to the management node, and passed on to the group call server node to such that the established group call is confirmed.

Figure 5:
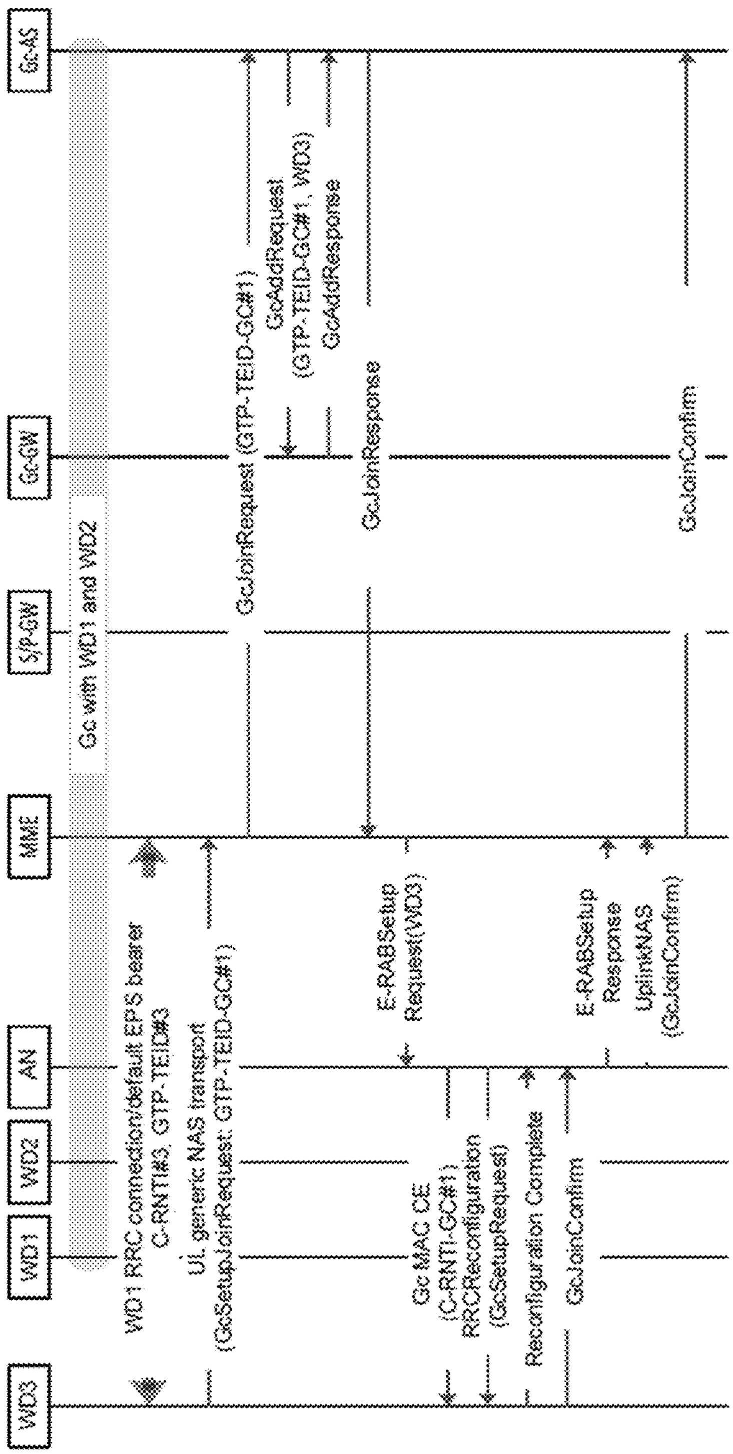
FIG. 5 illustrates an exemplary signaling flow for joining a group call.

FIG. 5 illustrates an exemplary group call flow for joining a group call according to an embodiment. In the illustrated embodiment, wireless device 3 requests to join a group call established between wireless devices 1 and 2, such as the group call established with reference to FIGS. 4A and 4B.

In an embodiment, wireless device 3 transmits an NAS message that indicates the wireless device requests to join the group call, the indication including the group call ID for the established group call. The management node transmits a join request to the group call server node, that then communicates with the group call gateway to process the group join request. The group call server node then transmits a response to the management node.

Once the response is received the management node and access node establish the data bearers (e.g., unicast data bearer and multicast data bearer) for the group call with wireless device 3. Once established, a group call join confirm message is sent to the group call server node.

Figure 6:
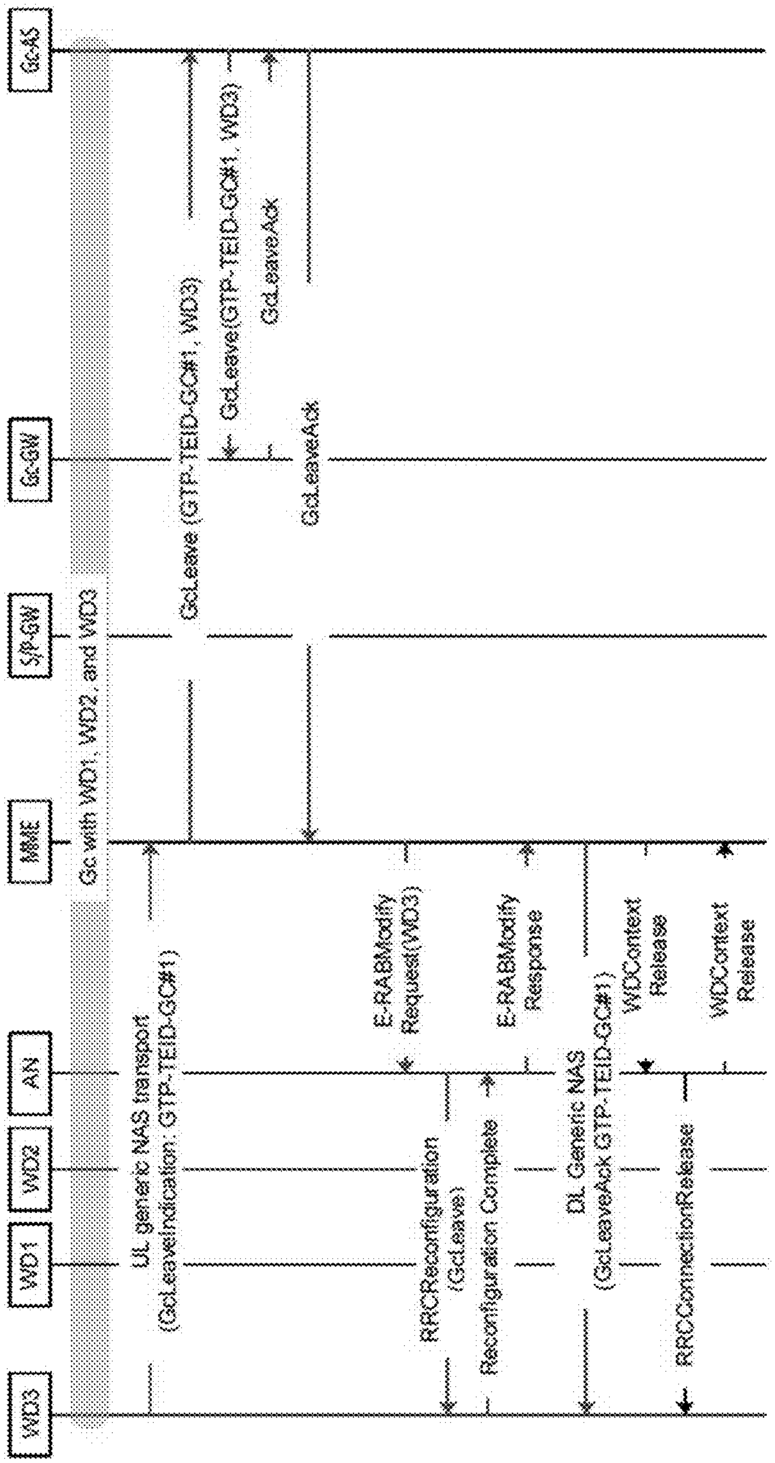
FIG. 6 illustrates an exemplary signaling flow for leaving a group call.

FIG. 6 illustrates an exemplary group call flow for leaving a group call according to an embodiment. In the illustrated embodiment, wireless device 3 requests to leave a group call established with wireless devices 1 and 2, such as the group call established with reference to FIGS. 4A and 4B and joined with reference to FIG. 5.

In an embodiment, wireless device 3 transmits an NAS message that indicates the wireless device requests to leave the group call, the indication including the group call ID. The management node transmits a leave request to the group call server node that then communicates with the group call gateway to process the group leave request. The group call server node then transmits a response to the management node.

Once the response is received the management node and access node process messages to release the data bearers (e.g., unicast data bearer and multicast data bearer) for the group call established for wireless device 3. Once processed, a group call leave confirm message is sent to the group call server node.

Figure 7:
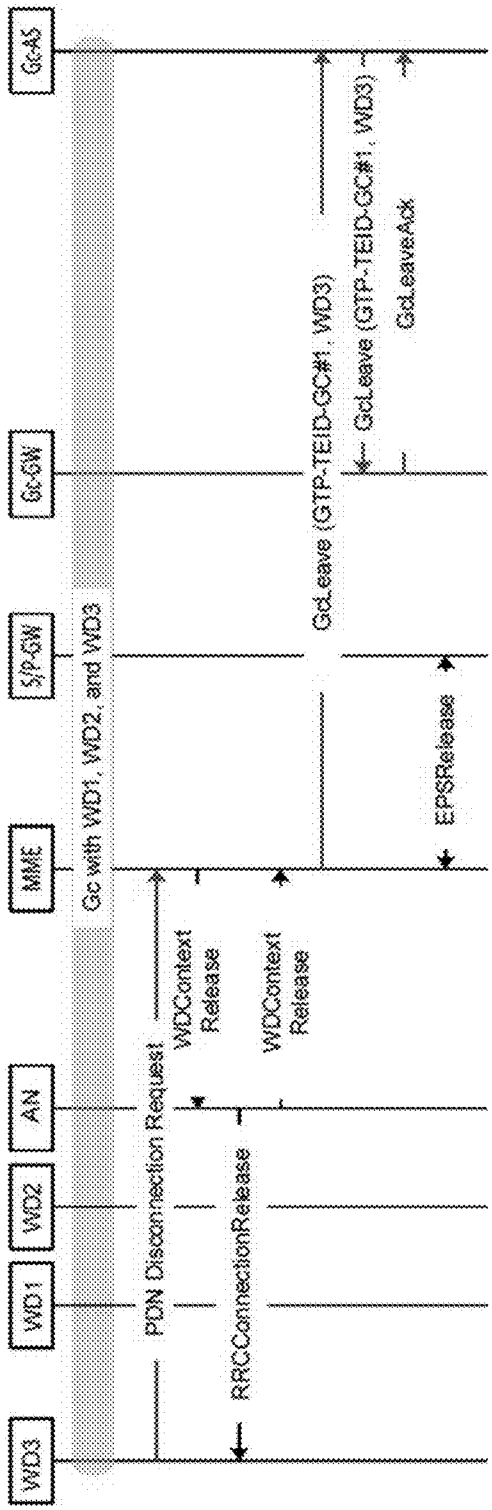
FIG. 7 illustrates an exemplary signaling flow for releasing a group call.

FIG. 7 illustrates an exemplary group call flow for releasing a group call according to an embodiment. In the illustrated embodiment, a group call that has been established between wireless devices 1, 2, and 3 is released.

In an embodiment, a PDN disconnect request is sent from one of wireless devices 1, 2, and 3 to the management node. The management node then sends a context release command to the access node, where the RRC connections are released for wireless devices 1, 2, and 3 related to the group call. A group call end indication is then sent from the management node to the group call server node, which processes the indication to end the group call with the group call gateway node. Once the group call end is acknowledged, the established multicast bearer for the group call is released.

Figure 8:
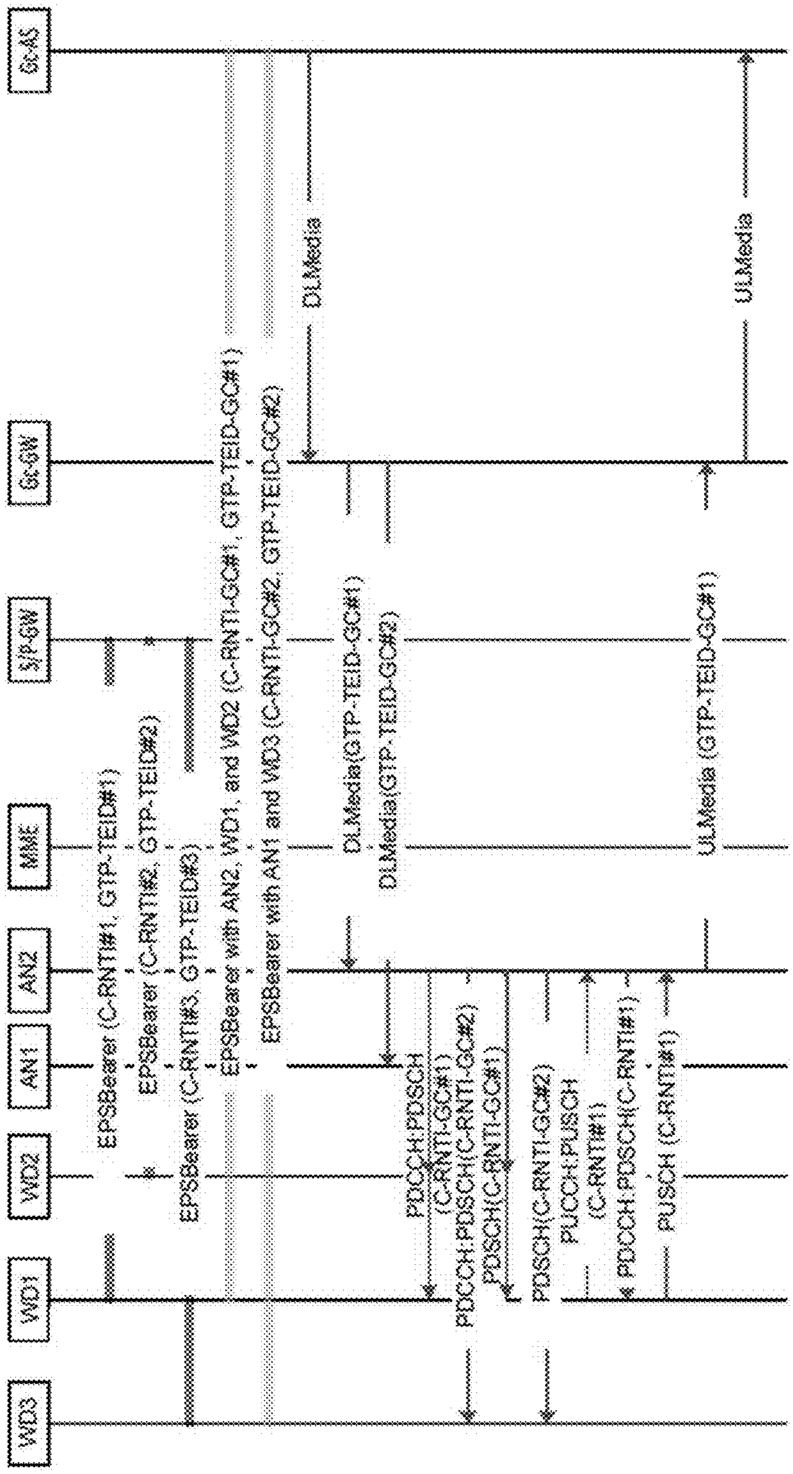
FIG. 8 illustrates an exemplary signaling flow for media flow in a group call.

FIG. 8 illustrates an exemplary group call flow for media flow for a group call according to an embodiment. In the illustrated embodiment, media is shared for a group call established between wireless devices 1, 2, and 3, where wireless devices 1 and 2 are in communication with access node 2 and wireless device 3 is in communication with access node 1. In an embodiment, EPS bearers have been established between wireless device 1, access node 2, and the core network, between wireless device 2, access node 2, and the core network, and between wireless device 3, access node 1, and the core network. In an embodiment, wireless devices 1, 2, and 3 comprise a unicast radio bearer and a multicast radio bearer, while access node 1 and access node 2 each comprise a multicast data bearer associated with the group call.

Downlink media data, such as group call voice data, may be transmitted from the group call server node, to the group call gateway node, and through the core over the relevant multicast bearer to access nodes 1 and 2. Access nodes 1 and 2 may then schedule radio transmission to wireless devices 1, 2 and 3 using a scheduler, such as a dynamic scheduler. Based on the scheduled transmissions, access nodes 1 and 2 may transmit the downlink media data to wireless devices 1, 2, and 3 using downlink transmissions (e.g., downlink physical resource blocks). The media may be transmitted to wireless devices 1, 2, and 3 using the multicast radio data bearer established between the wireless devices and the access nodes.

In an embodiment, wireless device 1 may comprise permission to transmit uplink media data (e.g., voice data) for the group call, or wireless device 1 may have the floor. Here, access node 2 may schedule an uplink transmission for wireless device 1, and according to the schedule, wireless device 1 may transmit the uplink data to access node 2. The media may be transmitted from wireless device 1 to access node 2 over a physical uplink shared channel (PUSCH). The uplink data may then be transmitted from access node 2 to the group call server node over the established bearer for the group call.

Figure 9:
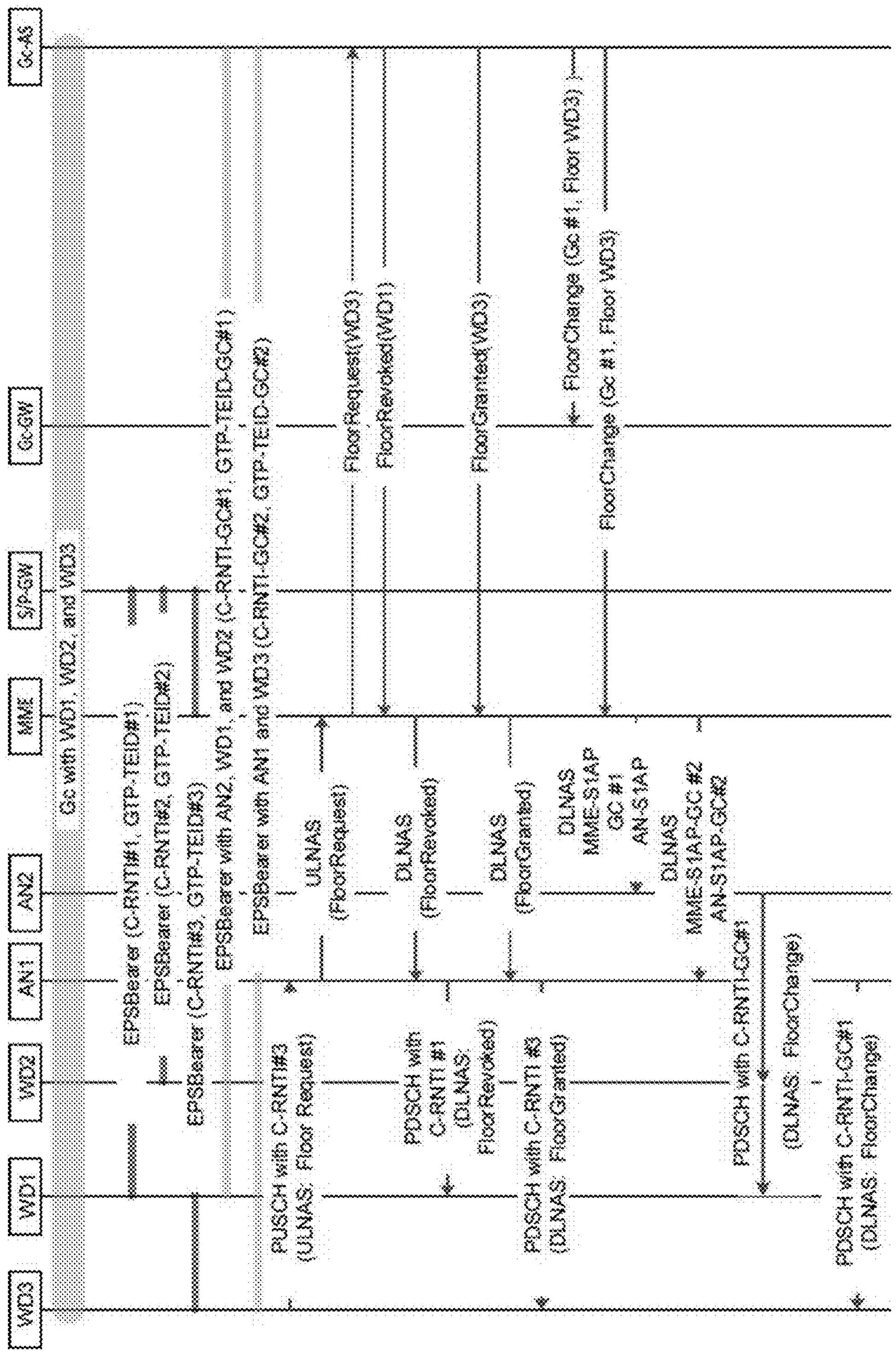
FIG. 9 illustrates an exemplary signaling flow for group call floor management.

FIG. 9 illustrates an exemplary group call flow for floor control according to an embodiment. In the illustrated embodiment, uplink permissions for the group call (e.g., the floor) is revoked from wireless device 1 and granted to wireless device 3. In this example, a sole wireless device is permitted uplink permissions at a given time. In other examples, multiple wireless device may be permitted uplink permissions.

In the illustrated embodiment, wireless devices 1 and 2 are in communication with access node 2 and wireless device 3 is in communication with access node 1. In an embodiment, EPS bearers have been established between wireless device 1, access node 2, and the core network, between wireless device 2, access node 2, and the core network, and between wireless device 3, access node 1, and the core network.

A request in the form of an NAS message over an uplink shared channel may be received from wireless device 3 at access node 1, and access node 1 may subsequently submit the floor request to the management node as an NAS message. The management mode may communicate with the group call server node such that the group call server node sends a message that revokes the floor from wireless device 1 and grants the floor to wireless device 3. The floor revocation and grant messages may then be relayed from the management node to the respective access nodes as a NAS message, such that the respective access nodes transmit the revocation and grant to wireless devices 1 and 3 over a downlink shared channel.

In addition, the group call server node may transmit a floor change notification to the management node. The floor change notification message may then be relayed from the management node to the respective access nodes as a NAS message, such that the respective access nodes transmit the floor change notification to participant wireless devices over a downlink shared channel. In an embodiment illustrated in FIG. 9, the floor change messaging may be visible to the EPC system (e.g., management node).

Figure 10:
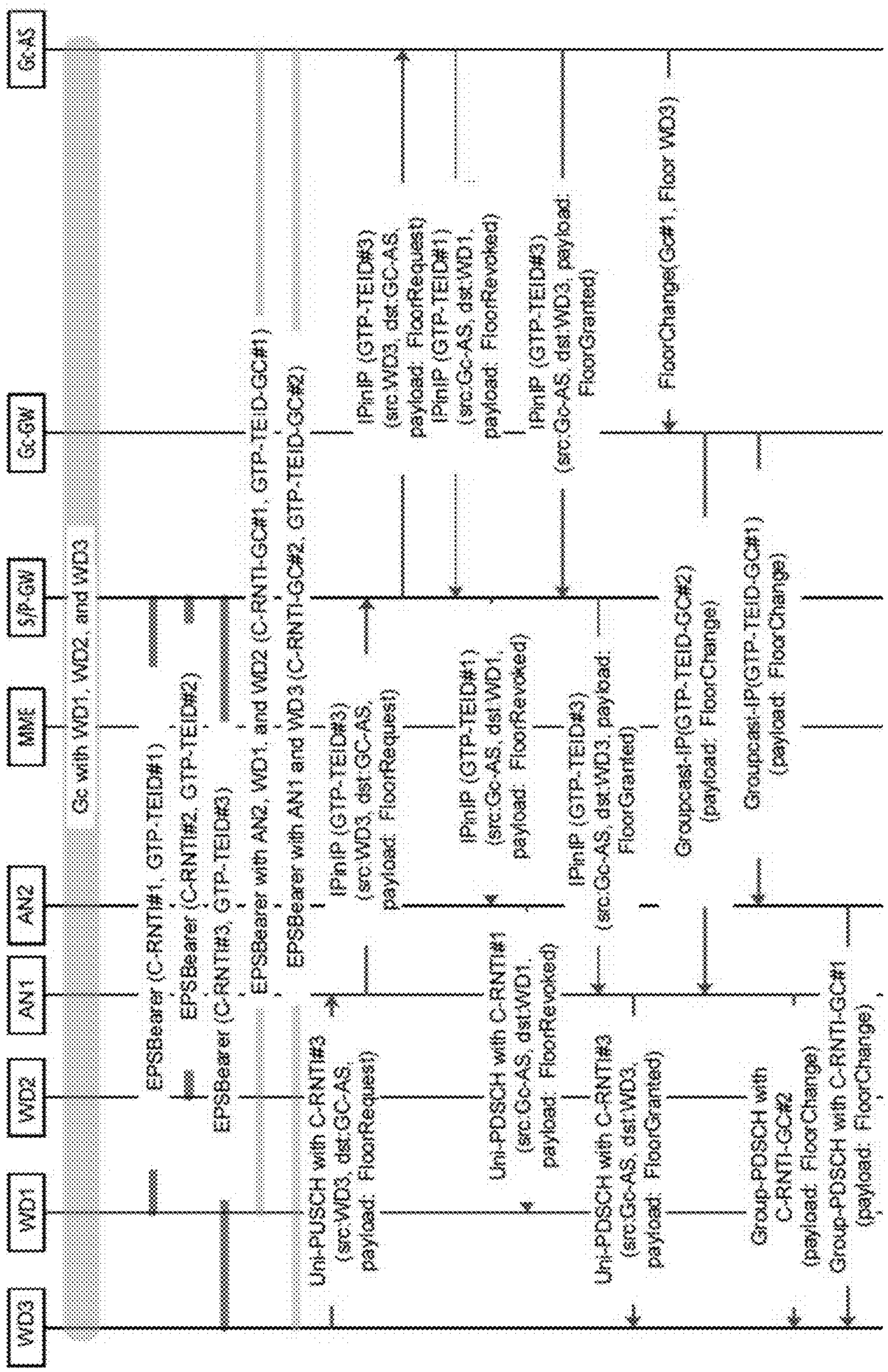
FIG. 10 illustrates another exemplary signaling flow for group call floor management.

FIG. 10 illustrates another exemplary group call flow for floor control according to an embodiment. In the illustrated embodiment, uplink permissions for the group call (e.g., the floor) is revoked from wireless device 1 and granted to wireless device 3. In this example, a sole wireless device is permitted uplink permissions at a given time. In other examples, multiple wireless device may be permitted uplink permissions.

In the illustrated embodiment, wireless devices 1 and 2 are in communication with access node 2 and wireless device 3 is in communication with access node 1. In an embodiment, EPS bearers have been established between wireless device 1, access node 2, and the core network, between wireless device 2, access node 2, and the core network, and between wireless device 3, access node 1, and the core network.

A request in the form of an IP packet message that includes a floor request as payload data may be received at access node 1 over an uplink shared channel from wireless device 3, and access node 1 may subsequently transmit the IP packet message comprising the floor request to the gateway node as an IP in IP packet message. The gateway node may relay the IP packet to the group call server node. The group call server node may retrieve floor request from the payload data of the IP packet message and subsequently send IP in IP packet messages that revokes the floor from wireless device 1 and grants the floor to wireless device 3. The floor revocation and grant IP in IP packet messages may be relayed from the gateway node to the respective access nodes, such that the respective access nodes transmit the revocation and grant IP in IP packet messages to wireless devices 1 and 3 over a downlink shared channel.

In addition, the group call server node may transmit a floor change notification as an IP in IP packet message to the gateway node. The floor change notification IP in IP packet message may then be relayed from the gateway node to the respective access nodes as groupcast IP data, such that the respective access nodes transmit the floor change notification to participant wireless devices over a downlink shared channel.

In an embodiment illustrated in FIG. 10, the floor change messaging may not be visible to the EPC system (e.g., management node or gateway node). For example, because the group call floor request, revocation, grant, and change notification messages may be transmitted as payload data in an IP packet, the EPC nodes that relay the messages (e.g., gateway node) may not have visibility to the payload of the IP packet. Here, the gateway server node may access the payload data of the IP packets and thus process the group call functions without visibility from the other EPC nodes or components.

Figure 11:
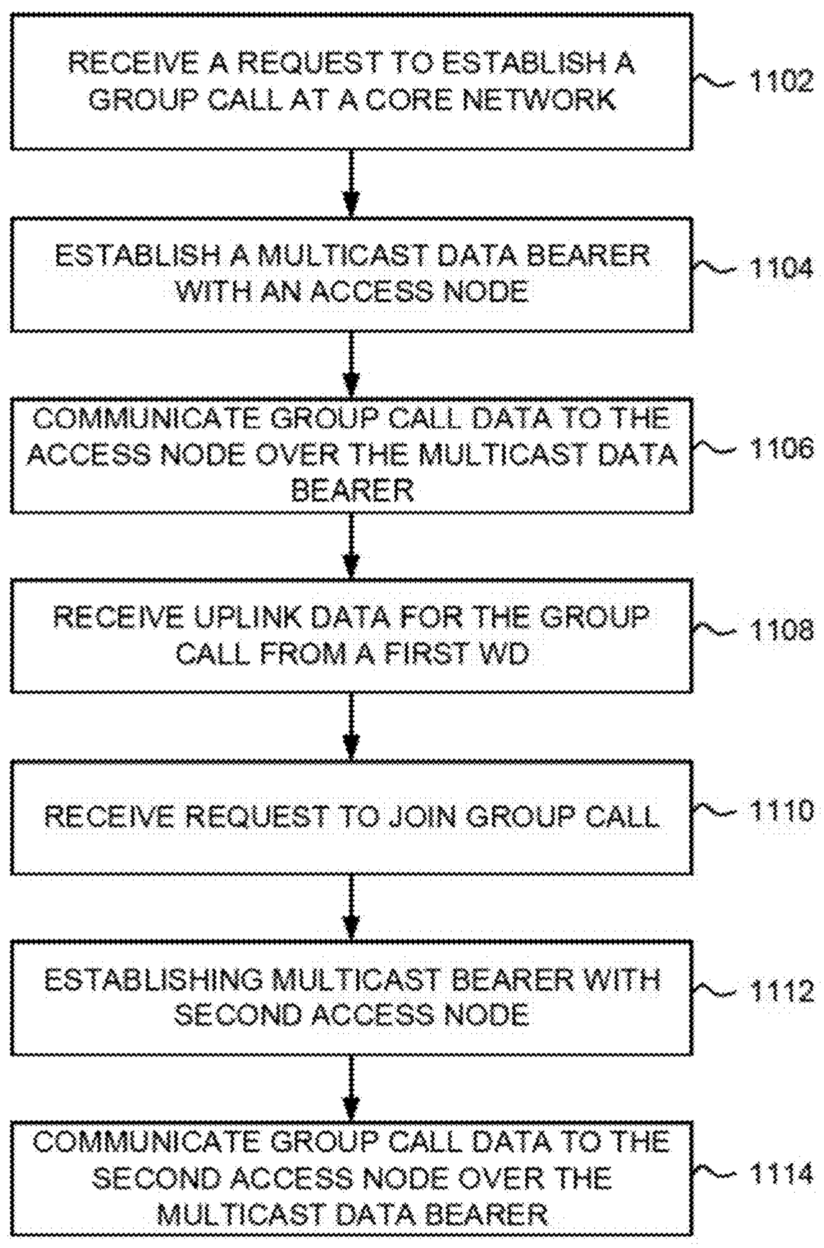
FIG. 11 illustrates an exemplary method for performing a group call using a data bearer.

FIG. 11 illustrates an exemplary method for performing a group call using a data bearer according to an embodiment. The method will be discussed with reference to the exemplary communication system 300 illustrated in FIG. 3, however, the method can be implemented with any suitable communication system.

Referring to FIG. 11, at step 1102, a request to establish a group call may be received at a core network. For example, wireless device 302 may transmit a request to establish a group call to access node 308, and access node 308 may then transmit the request to the core network (e.g., one or more of management node 312, gateway nodes 314 and 316, group call gateway 318, and group call node 320).

At step 1104, a multicast data bearer may be established with the access node such that group call data from the core network is communicated over the multicast data bearer to the access node. For example, a multicast data bearer may be established between access node 308 and the core network. Group call data may be communicated back and forth between access node 308 and the core network over the multicast data bearer.

For example, as illustrated in FIG. 8 that shows media flow in a group call, downlink media data (e.g., voice data) may be relayed from a group call server node to participant wireless devices. The downlink data may be transmitted through a core network over the established multicast bearer for the group call to the participating access nodes (e.g., from group call server node 320 to access nodes 308 and 310).

In an embodiment, wireless devices 302 and 304 may comprise the established multicast bearer for the group call as well as an established unicast bearer. For example, the established multicast bearer may be used to communicate group call data between wireless devices 302 and 304 and access node 308, and each wireless device may comprise a unicast bearer to communicate other data (such as control data) with access node 308.

At step 1106, communicating group call data between the access node and a first wireless device and the access node and a second wireless device, wherein downlink group call data from the core network for both the first wireless device and the second wireless device is transmitted to the access node over the multicast data bearer. For example, access node 308 may be in communication with wireless device 302 and wireless device 304, where both of these wireless devices are participants on the group call. Group call data for these participant wireless devices may be carried from the core network to access node 308 over the multicast data bearer, as discussed herein. Given that the group call data (e.g., voice data) is the same for both of these participant wireless devices, the single multicast data bearer used to carry the data may be an efficient way to transport data between the core network and access node 308.

In an embodiment, a scheduler at access node 308 may schedule downlink transmissions to carry the group call data to wireless devices 302 and 304. For example, dynamic scheduling may be used, where resources (e.g., physical resource blocks) are assigned for each transmission, and subsequently the physical resource blocks and transmitted between access node 308 and the respective wireless device according to the assignment schedule. In an embodiment, semi-persistent scheduling may be used to schedule downlink transmissions to carry the group call data to wireless devices 302 and 304. For example, a determined amount of resource blocks may be reserved for downlink transmissions from access node 308 to participant wireless devices of the group call, where the resource blocks are reserved for a predetermined period of time (e.g., semi-persistent scheduling).

At step 1108, uplink data for the group call may be received at the access node from the first wireless device, wherein the uplink data is carried from the access node to the core network over the group call data bearer. For example, in an embodiment wireless device 302 may comprise permission to transmit uplink data for the group call. Wireless device 302 may transmit the uplink data to access node 306, and access node 306 may then transmit the uplink data to the core network over the established multicast data bearer.

For example, as illustrated in FIG. 8 that shows media flow in a group call, uplink media data (e.g., voice data) may be transmitted from a wireless device to an access node and subsequently relayed to a group call server node. Here, the group call server node may receive uplink media data and subsequently communicate back to participant wireless devices as downlink media data, as discussed herein.

In an embodiment, wireless device 302 may comprise uplink permissions such that the wireless device may transmit uplink data on the group call, however the wireless device may not be transmitted downlink data because of the uplink permission. For example, in an embodiment where wireless device 302 is the sole wireless device that comprises uplink permission for the group call, the wireless device will not have downlink data to receive, and instead will only have uplink data to transmit. Accordingly, the permission to transmit uplink data on a group call may serve to effectively provide a half duplex communication link (e.g., uplink) between the wireless network and the participant wireless device. In an embodiment, the remaining participant wireless devices do not comprise uplink permissions for the group call, and thus do not have uplink data to transmit for the group call. Accordingly, the lack of permission to transmit uplink data on a group call may serve to effectively provide a half duplex communication link (e.g., downlink) between the wireless network and the participant wireless devices.

At step 1110, a request is received at the core network to join the group call, wherein the core network is in communication with a second access node. For example, wireless device 306 may transmit a request to join the group call to access node 310, and access node 310 may then transmit the request to the core network (e.g., one or more of management node 312, gateway nodes 314 and 316, group call gateway node 318, and group call server node 320).

At step 1112, a second multicast data bearer may be established with the second access node such that group call data from the core network is communicated over the multicast data bearer to the access node. For example, a second multicast data bearer may be established between access node 310 and the core network. Group call data may be communicated back and forth between access node 310 and the core network over the multicast data bearer. The established multicast bearer for access node 310 may be similar to the multicast bearer established for access node 308.

At step 1114, communicating group call data between the second access node and a third wireless device and the second access node and a plurality of wireless devices, wherein downlink group call data from the core network for the third wireless device and the plurality of wireless devices is transmitted to the second access node over the second multicast data bearer. For example, access node 310 may be in communication with wireless device 306 and a second wireless device (not illustrated), where both of these wireless devices are participants on the group call. Group call data for these participant wireless devices may be carried from the core network to access node 310 over the multicast data bearer. Given that the group call data is the same for both of these participant wireless devices, the single multicast data bearer used to carry the data may be an efficient way to transport data between the core network and access node 310.

Figure 12:
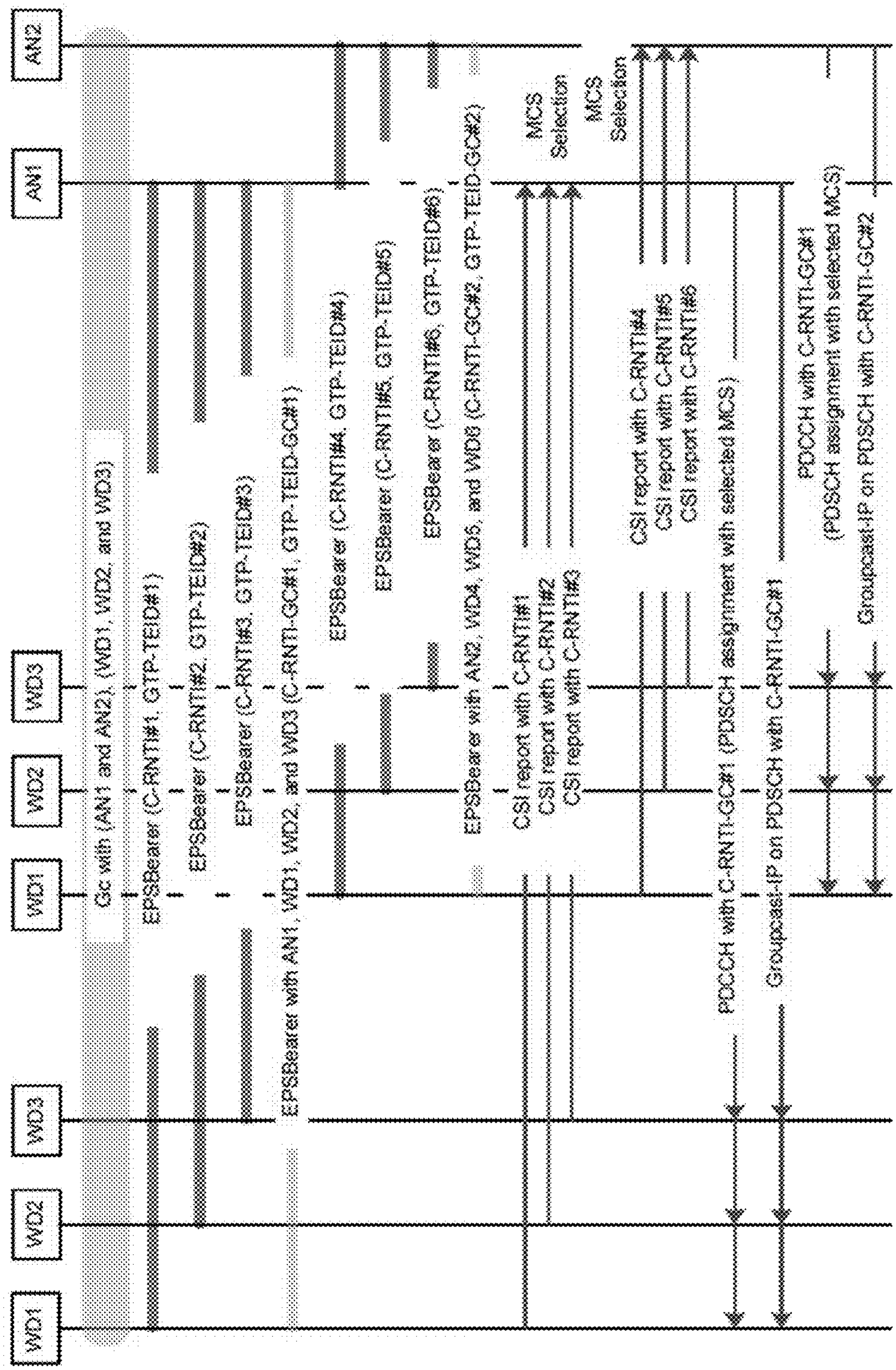
FIG. 12 illustrates an exemplary signaling flow for assigning modulation and coding schemes for a group call.

FIG. 12 illustrates an exemplary group call flow for assigning modulation and coding schemes (MCS) according to an embodiment. In the illustrated embodiment, wireless devices 1, 2, and 3 are in communication with access node 1 and wireless devices 4, 5, and 6 are in communication with access node 2. In an embodiment, EPS bearers have been established between wireless devices 1, 2, and 3, respectively, access node 2, and the core network, and between wireless devices 4, 5, and 6, respectively, access node 2, and the core network, as illustrated.

Channel status indicator reports may be received from a plurality of wireless devices 1, 2, 3, 4, 5, and 6 at the respective access node, where the reports may comprise channel quality indicator (CQI) information, other received signal level metric data, and any other suitable channel quality information. Access nodes 1 and 2 may process the received data and determine a modulation and coding scheme for the group call transmissions. Access nodes 1 and 2 may then transmit downlink resource assignments to their respective wireless devices with indications of the selected MCS for each access node, and subsequently transmit downlink group call data using the selected MCS.

Figure 13:
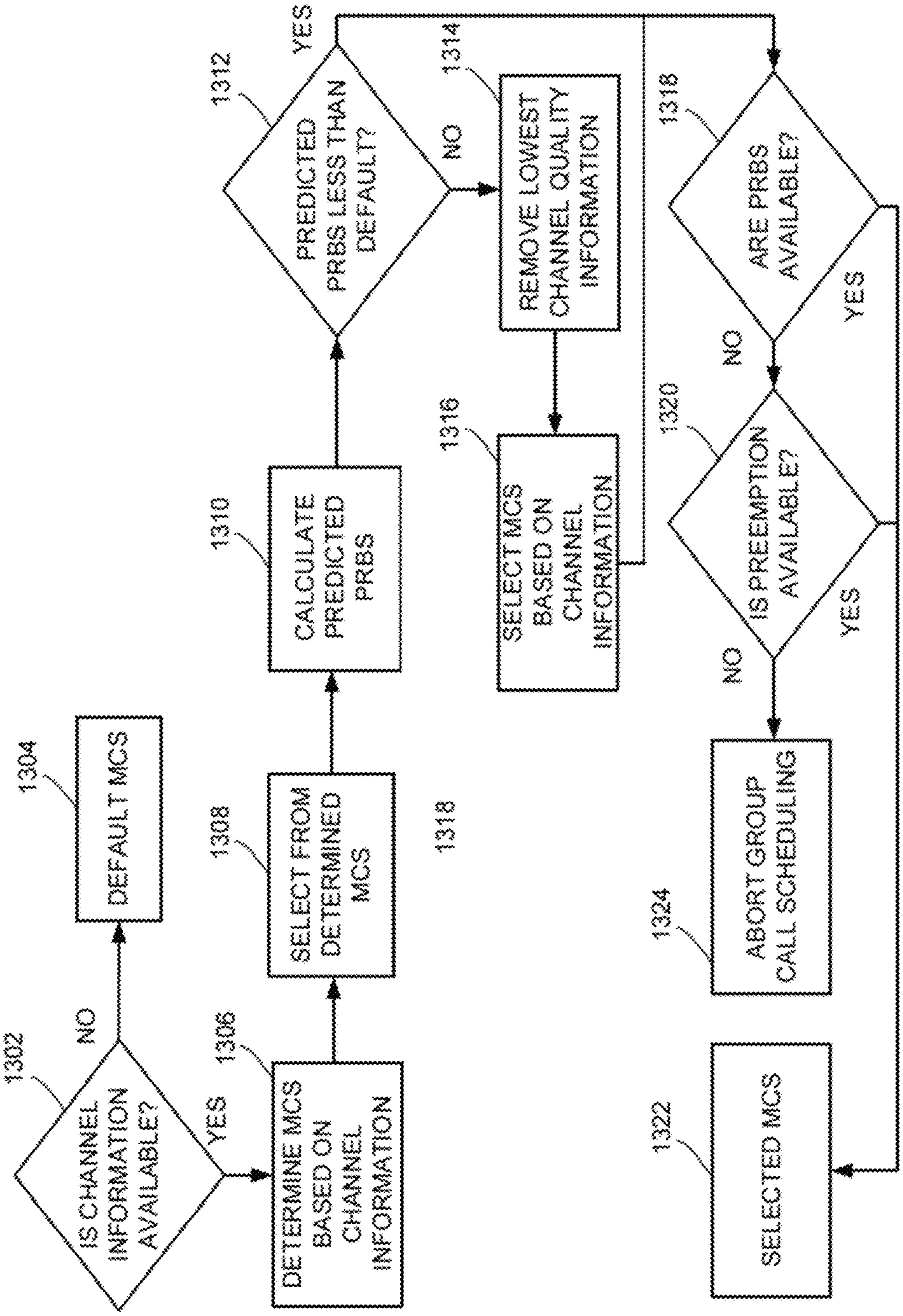
FIG. 13 illustrates an exemplary method for selecting modulation and coding schemes for a group call.

FIG. 13 illustrates an exemplary method for determining modulation and coding schemes for a group call according to an embodiment. The method will be discussed with reference to the exemplary communication system 300 illustrated in FIG. 3, however, the method can be implemented with any suitable communication system.

Referring to FIG. 13, at step 1302, it is determined whether channel status information is available for a plurality of participant wireless devices on a group call. For example, wireless devices 302, 304, and 306 may comprise participants on an established group call in accordance with various disclosed embodiments. In some example, the wireless devices may transmit channel status information reports (e.g., CQI information). It may be determined whether channel status information is available at access nodes 308 and 310 for participant wireless devices of the group call (e.g., wireless devices 302, 304, and 306). When channel status information is not available, the method progresses to step 1304, where a default modulation and coding scheme is used.

In an embodiment, the default modulation and coding scheme may comprise a default scheme for use across the group call (e.g., for each wireless device participant). For example, a default scheme suitable across wireless device participants (e.g., comprising various channel conditions) may be determined, and each participant wireless device may be assigned the default scheme. In some example, such a default scheme may not take benefit from advantageous channel conditions for wireless device participants with strong channel conditions. The default modulation and coding scheme may be determined in any suitable manner (e.g., based on an average of channel conditions, based on a number of wireless device participants, based on historic information storated at the access nodes, and the like).

When channel status information is available, the method progresses to step 1306, where MCS determinations are made based on the channel status information. For example, access node 308 may receive channel status information from wireless devices 302 and 304 (and other participant wireless devices not depicted) and access node 310 may receive channel status information from wireless device 306 (and other participant wireless devices not depicted). Access node 308 may select a modulation and coding scheme based on the channel status information (e.g., CQI levels) from participant wireless devices received at the access node and access node 310 may select a modulation and coding scheme based on the channel status information (e.g., CQI levels) from participant wireless devices received at the access node.

In an embodiment, MCS determination may be based on the channel quality (e.g., CQI) for participant wireless devices in communication with a particular access node. For example, where MCS selection is based on a reported CQI from participant wireless devices, an MCS may be associated with each reported CQI (e.g., QPSK for CQI 1, 16QAM for QCI 7, 64 QAM for CQI 10, and the like). In an embodiment, an MCS may be determined for individual participant wireless devices in communication with an access node based on the individual channel information (e.g., CQI) reported by the individual participant wireless device. In an embodiment, a data rate may similarly be determined based on the reported CQIs.

At step 1308, an MSC may be selected from the determined schemes for the individual wireless devices. For example, at access nodes 308 and 310 an MCS may be selected for the access nodes based on the MCSs determined for the individual participant wireless devices in communication with the respective access node (e.g., wireless devices 302, 304, and 306).

In an embodiment, the average MCS may be selected from among the individual determined MCSs at a given access node. For example, an average MCS (or average efficiency associated with the MCSs) may be calculated based on the individual determined MCCs at the access node, and the average MCS (or MCS associated with the average efficiency) may be selected for group call data communication at the access node. In an embodiment, an average data rate may similarly be selected for the group data communication at the access node.

In an embodiment, a minimum MCS may be selected from among the individual determined MCSs at an access node. For example, a lowest MCS (or lowest efficiency associated with the MCSs) may be identified based on the individual determined MCCs at the access node, and the minimum MCS (or MCS associated with the minimum efficiency) may be selected for group call data communication at the access node. In an embodiment, a minimum data rate may similarly be selected for the group call data communication at the access node.

At step 1310, a number of physical resource blocks may be predicted for the selected MCS based on an amount of group call data to be transmitted. For example, an amount of group call data may be available for transmissions (e.g., received at the access node, such as access node 308) or otherwise may be predetermined. Based on the selected modulation and coding scheme for an access node (e.g., access node 308), and in some embodiments the selected data rate, a number of physical resource blocks may be predicted (e.g., based on the amount of data to be transmitted, the efficiency for the MCS, the characteristics of the physical resource blocks available for the transmission, and other suitable factors).

In an embodiment, a default modulation and coding scheme may be available for communication at an access node (e.g., access node 308). The default modulation and coding scheme may not possess the same efficiency/data rate benefits as the selected modulation and coding scheme for the access node, in some embodiments. A number of physical resource blocks may also be predicted for the default MCS based on an amount of group call data to be transmitted. For example, based on the default modulation and coding scheme for an access node (e.g., access node 308), and in some embodiments a default data rate, a number of physical resource blocks may be predicted (e.g., based on the amount of data to be transmitted, the efficiency for the MCS, the characteristics of the physical resource blocks available for the transmission, and other suitable factors).

At step 1312, it may be determined whether the predicted physical resource blocks for the selected MCS is less than the predicted physical resource blocks for the default MCS at a given access node. For example, at access node 308, the predicted physical resource blocks for the selected MCS may be compared to the predicted physical resource blocks for the default MCS. If the predicted physical resource blocks for the selected MCS are less than the predicted physical resource blocks for the default MCS, the method may progress to step 1320.

If the predicted physical resource blocks for the selected MCS are not less than the predicted physical resource blocks for the default MCS, the method may progress to step 1314. At step 1314, channel status information (e.g., CQIs) received from participant wireless devices at access node 308 may be removed when they fail to meet a removal criteria. For example, in an embodiment where CQI is used in part to determine MCS, reported CQIs that fall below a CQI threshold (e.g., CQI of 5, 6, 10, or the like) may be removed with regard to determining and selecting an MCS for access node 308. Any other suitable removal criteria may similarly be implemented.

At step 1316, updated modulation and coding schemes may be selected based on the channel status information remaining after the removal. In an embodiment, an MCS may be determined for individual participant wireless devices in communication with an access node based on the individual channel status information (e.g., CQIs) that remain after the removing. In an embodiment, an updated data rate may similarly be determined based on the individual channel status information after the removing. The updated modulation and coding schemes and updated data rates may be determined in a manner similar to the determined modulation and coding schemes and data rates at step 1306.

In an embodiment, an updated modulation and coding scheme may be selected from among the determined modulation and coding schemes. For example, the selected MCS may be an average of the determined MCSs after the removing or a minimum of the determined MCSs after the removing. The updated MCS may be selected in a manner similar to the selected MCS at step 1308.

In an embodiment, predicted physical resource blocks may be recalculated based on the updated modulation and coding scheme selected. For example, a number of physical resource blocks may be predicted for the selected MCS based on an amount of group call data to be transmitted in a manner similar to the predicted physical resource blocks at step 1310.

In an embodiment, the removal criteria and selected MCS may be dynamic based on the predicted physical resource blocks for the updated MCS selected. For example, the removal criteria may be selected such that received channel status information (e.g., CQIs) are removed until the predicted number of physical resource blocks for the updated MCS that is selected is less than the predicted physical resource blocks for the default MCS.

At step 1318, it is determined whether the physical resource blocks are available to be used to transmit the group call data from the given access node to the participant wireless devices using the selected MCS. For example, it is determined whether physical resource blocks at access node 308 associated with the group call (e.g., reserved for the group call, within a pool of resource blocks assigned to the group call, and the like) are available to be used to transmit the group call data to the participant wireless devices (e.g., wireless device 302 and 304) using the selected modulation and coding scheme. If the physical resource blocks are available, the method progresses to step 1322, where the selected MCS is used to transmit the group call data from access node 308 to the participant wireless devices.

If the physical resource blocks are not available, the method progresses to step 1320, where it is determined whether physical resource blocks are available to be preempted for the group call. For example, it is determined whether physical resource blocks at access node 308 can be preempted from non-guaranteed radio bearers that carry other wireless devices' downlink data from access node 308, low priority wireless devices, and other sources from which physical resource blocks can be preempted (e.g., preempted without impacting service requirements for the system). If the physical resource blocks sufficient to complete the transmission are available for preemption, the method progresses to step 1322, where the physical resource blocks are preempted and the selected MCS is used to transmit the group call data from access node 308 to the participant wireless devices.

If the physical resource blocks sufficient to complete the transmission are not available for preemption, the method progresses to step 1324, where the group call scheduling algorithm is aborted. For example, because the resource blocks are not available, the scheduling for the group call according the outlined algorithm may be aborted such that individual scheduling for participant wireless devices may be performed for the group call.

Figure 14:
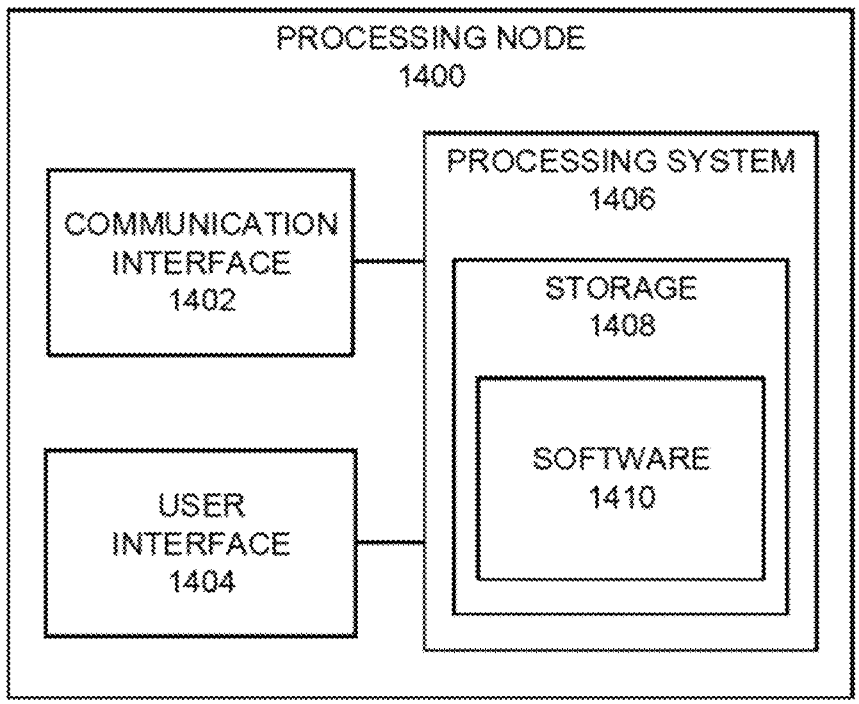
FIG. 14 illustrates an exemplary processing node.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways. FIG. 14 illustrates an exemplary processing node 1400 in a communication system. Processing node 1400 comprises communication interface 1402, user interface 1404, and processing system 1406 in communication with communication interface 1402 and user interface 1404. Processing node 1400 can be configured to determine a communication access node for a wireless device. Processing system 1406 includes storage 1408, which can comprise a disk drive, flash drive, memory circuitry, or other memory device. Storage 1408 can store software 1410 which is used in the operation of the processing node 1400. Storage 1408 may include a disk drive, flash drive, data storage circuitry, or some other memory apparatus. Software 1410 may include computer programs, firmware, or some other form of machine-readable instructions, including an operating system, utilities, drivers, network interfaces, applications, or some other type of software. Processing system 1406 may include a microprocessor and other circuitry to retrieve and execute software 1410 from storage 1408. Processing node 1400 may further include other components such as a power management unit, a control interface unit, etc., which are omitted for clarity. Communication interface 1402 permits processing node 1400 to communicate with other network elements. User interface 1404 permits the configuration and control of the operation of processing node 1400.

Examples of processing node 1400 include management node 312, group call server node 3120, and gateway nodes 314, 316, and 318. Processing node 1400 can also be an adjunct or component of a network element, such as an element of access nodes 106, 108, 308, or 310 and the like. Processing node 1400 can also be another network element in a communication system. Further, the functionality of processing node 1400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing a group call with a data bearer, the method comprising:

receiving, at a core network in communication with an access node, a request to establish a group call;

establishing a multicast data bearer with the access node wherein group call data from the core network is communicated over the multicast data bearer to the access node;

communicating group call data between the access node and a first wireless device and the access node and a second wireless device, wherein downlink group call data from the core network for both the first wireless device and the second wireless device is transmitted to the access node over the multicast data bearer;

receiving, at the access node from the first wireless device, uplink data for the group call, wherein the uplink data is carried from the access node to the core network over the multicast data bearer; and preventing the second wireless device from transmitting uplink data for the group call over the multicast data bearer when the first wireless device is transmitting uplink data over the multicast data bearer.

2. The method of claim 1, further comprising:

receiving, at the core network, a request to join the group call, wherein the core network is in communication with a second access node;

establishing a second multicast data bearer with the second access node based on the request to join wherein group call data from the core network is communicated over the multicast data bearer to the second access node;

communicating group call data between the access node and a plurality of wireless devices, wherein downlink group call data from the core network for the plurality of wireless devices is transmitted to the access node over the multicast data bearer.

3. The method of claim 1, wherein the first wireless device is one of a plurality of wireless devices participating in the group call and when the access node is permitted to transmit uplink data for the first wireless device for the group call, any remaining wireless devices of the plurality of wireless devices are not permitted to transmit uplink data for the group call.

4. The method of claim 3, wherein the remaining wireless devices that comprise group call participants comprise a half duplex connection for the group call at least because the remaining wireless devices are not permitted to transmit uplink data for the group call.

5. The method of claim 1, wherein the group call data is transmitted from the access node to the first wireless device and second wireless device over a physical shared downlink channel.

6. The method of claim 5, wherein the group call data is transmitted from the first wireless device to the access node over a physical shared uplink channel.

7. The method of claim 5, wherein wireless resources are assigned for downlink group data transmissions using one of dynamic scheduling and semi-persistent scheduling.

8. The method of claim 1, further comprising:

receiving, at the core network from the second wireless device, a request for permission to transmit uplink data for the group call;

revoking permission from the first wireless device to transmit uplink data for the group call;

granting permission to the second wireless device to transmit uplink data for the group call; and receiving, at the access node from the second wireless device, uplink data for the group call, wherein the uplink data is carried from the access node to the core network over the group call data bearer.

9. The method of claim 8, further comprising:

transmitting, to participant wireless device on the group call, an indication that the second wireless device has permission to transmit uplink data for the group call.

10. The method of claim 8, wherein the group call data comprises voice data and the core network comprises a packet switched network.

11. A system for performing a group call with a data bearer, the system comprising:

a core network comprising a processing node with a processor configured to:

receive, at the core network that is in communication with an access node, a request to establish a group call; and establish a multicast data bearer with the access node wherein group call data from the core network is communicated over the multicast data bearer to the access node;

the access node is configured to:

communicate group call data between the access node and a first wireless device and the access node and a second wireless device, wherein downlink group call data from the core network for both the first wireless device and the second wireless device is transmitted to the access node over the multicast data bearer;

receive, at the access node from the first wireless device, uplink data for the group call, wherein the uplink data is carried from the access node to the core network over the multicast data bearer; and preventing the second wireless device from transmitting uplink data for the group call over the multicast data bearer when the first wireless device is transmitting uplink data over the multicast data bearer.

12. The system of claim 11, wherein, the core network is further configured to:

receive, at the core network, a request to join the group call, wherein the core network is in communication with a second access node; and establish a second multicast data bearer with the second access node based on the request to join wherein group call data from the core network is communicated over the multicast data bearer to the second access node;

the access node is further configured to:

communicate group call data between the access node and a plurality of wireless devices, wherein downlink group call data from the core network for the plurality of wireless devices is transmitted to the access node over the multicast data bearer.

13. The system of claim 11, wherein the first wireless device is one of a plurality of wireless devices participating in the group call and when the access node is permitted to transmit uplink data for the first wireless device for the group call, any remaining wireless devices of the plurality of wireless devices are not permitted to transmit uplink data for the group call.

14. The system of claim 13, wherein the remaining wireless devices that comprise group call participants comprise a half duplex connection for the group call at least because the remaining wireless devices are not permitted to transmit uplink data for the group call.

15. The system of claim 11, wherein the group call data is transmitted from the access node to the first wireless device and second wireless device over a physical shared downlink channel.

16. The system of claim 15, wherein the group call data is transmitted from the first wireless device to the access node over a physical shared uplink channel.

17. The system of claim 15, wherein wireless resources are assigned for downlink group data transmissions using one of dynamic scheduling and semi-persistent scheduling.

18. The system of claim 11, wherein, the core network is further configured to:

receive, at the core network from the second wireless device, a request for permission to transmit uplink data for the group call;

revoke permission from the first wireless device to transmit uplink data for the group call;

grant permission to the second wireless device to transmit uplink data for the group call; and the access node is further configured to:

receive, at the access node from the second wireless device, uplink data for the group call, wherein the uplink data is carried from the access node to the core network over the group call data bearer.

19. The system of claim 18, wherein the core network is further configured to:

transmit, to participant wireless device on the group call, an indication that the second wireless device has permission to transmit uplink data for the group call.

20. The system of claim 18, wherein the group call data comprises voice data and the core network comprises a packet switched network.

* * * * *